INVENTORS
DONALD I. HOKE
DONALD L. SURBEY

BY William N. Pittman
ATTORNEY

United States Patent Office 3,531,525
Patented Sept. 29, 1970

3,531,525
PREPARATION OF N-3-HYDROXYALKYL ACRYLAMIDES BY HYDROLYSIS OF VINYL OXAZINES
Donald I. Hoke, Chagrin Falls, and Donald L. Surbey, Mayfield Heights, Ohio, assignors to The Lubrizol Corporation, Wickliffe, Ohio, a corporation of Ohio
Continuation-in-part of application Ser. No. 713,788, Mar. 18, 1968. This application Jan. 3, 1969, Ser. No. 788,819
Int. Cl. C07c $103/60$
U.S. Cl. 260—561                7 Claims

ABSTRACT OF THE DISCLOSURE

N-3-hydroxyalkyl acrylamides, and substituted derivatives thereof, are prepared by (1) reduction of an N-3-oxohydrocarbon-substituted acrylamide, (2) addition of an alcohol to the N-3-oxohydrocarbon-substituted acrylamide, followed by hydrogenation of the carbonyl group and elimination of the alcohol, or (3) hydroylsis of a 2-vinyl-5,6-dihydro-1,3-oxazine. The acrylamides are useful as monomers for conversion to polymers with a number of interesting properties, including utility as membranes for desalination of water by hyperfiltration. The polymers may be crosslinked by the action of such reagents as diisocyanates, dicarboxylic acid halides, and aldehydes in acidic solution.

---

This application is a continuation-in-part of copending application Ser. No. 713,788, filed Mar. 18, 1968, and now abandoned.

SUMMARY OF THE INVENTION

This invention relates to new compositions of matter, both monomeric and polymeric. More particularly, it relates to novel N-3-hydroxyalkyl acrylamides of the formula wherein $R^1$ is a hydrocarbon radical; each of $R^2$, $R^3$, $R^4$ and $R^5$ is individually hydrogen or a hydrocarbon radical; and $R^6$ is hydrogen or a lower alkyl radical; and polymers of said compounds. The invention further relates to a novel method for removal of dissolved impurities from water by hyperfiltration through a membrane comprising a polymer of an N-3-hydroxyalkyl acrylamide.

The term "hydrocarbon radical" as used herein includes aliphatic, cycloaliphatic and aromatic radicals. It also includes cyclic radicals wherein the ring is completed through another portion of the molecule; for example, $R^1+R^2$, and/or $R^4+R^5$, may be a cycloalkyl radical. Also included are substantially hydrocarbon radicals; that is, radicals containing inert substituents such as ether, ester, nitro or halogen provided such substituents are not present in amounts sufficient to detract substantially from the hydrocarbon character of the radical. The term "lower alkyl radical" includes radicals having up to about 10 carbon atoms.

In the preferred compounds of this invention, $R^1$, $R^4$ and $R^5$ are alkyl radicals, especially lower alkyl radicals; $R^2$ is hydrogen or an alkyl radical; $R^3$ is hydrogen; and $R^6$ is hydrogen or methyl.

THE MONOMERS

The following are illustrative compounds of this invention.

N-(1,1-dimethyl-3-hydroxybutyl)acrylamide

N-(1,1-dimethyl-3-hydroxybutyl)methacrylamide

N-(1,1-diethyl-2-methyl-3-hydroxypentyl)acrylamide

N-(1,3-diphenyl-1-methyl-3-hydroxypropyl)acrylamide

N-[1,3-di-(p-chlorophenyl)-1-methyl-3-hydroxypropyl]methacrylamide

N-[1-(2-hydroxycyclohexyl)-1-cyclohexyl]acrylamide

The compounds of this invention may be prepared by the reduction of N-3-oxohydrocarbon-substituted acrylamides, which are described in U.S. Pat. 3,277,056 and in copending application Ser. No. 582,501, filed Sept. 28, 1966, now U.S. Pat. No. 3,425,942. The reduction method must be one which reduces the carbonyl group but which does not at the same time reduce the olefinic bond. Preferred methods for accomplishing this are reduction with sodium borohydride and the Meerwein-Ponndorf-Verley reaction, which involves hydrogen interchange between the oxo group and a lower aliphatic alcohol in the presence of a metal alkoxide. These methods are well known in the art in their general application, and are not believed to require extended discussion.

A preferred method for converting an N-3-oxohydrocarbon-substituted acrylamide into an N-3-hydroxyalkyl acrylamide involves the preparation of a lower alkoxypropionamide by reaction of the N-3-oxohydrocarbon-substituted acrylamide with a lower alkanol in the presence of an alkaline catalyst, followed by reduction of the carbonyl group and removal of the lower alkoxy group, typically by pyrolysis in contact with strong alkali. The first step in this reaction sequence, the preparation of the lower alkoxypropionamide, is described in copending application Ser. No. 682,493, filed Nov. 13, 1967.

In the second step, the carbonyl group of the N-3-oxohydrocarbon-substituted alkoxypropionamide is reduced to a carbinol group, ordinarily by hydrogen in the presence of a suitable hydrogenation catalyst. (Other methods of reduction can be used, but the chief advantage of this method is that it makes possible ordinary hydrogenation without danger of reducing the olefinic bond of the acrylamide.) Typical catalysts which may be used are palladium, platinum and Raney nickel; Raney nickel is preferred.

Following reduction of the carbonyl group, the alkoxy group is removed by any of several methods which are known per se. Typical methods are described briefly in a recent review: P. F. Butskus et al., Russian Chemical Reviews, 35, 839 (1966). The preferred method is pyrolysis of the alkoxy compound in the presence of a basic reagent, ordinarily a strong base such as solid sodium hydroxide, at about 150–200° C. This reaction is conveniently carried out at reduced pressure.

Still another method for the preparation of the N-3-hydroxyalkyl acrylamides of this invention is by hydrolysis of a 2-vinyl-5,6-dihydro-1,3-oxazine such as is described in U.S. Pat. 2,968,657. Oxazines of this type may be prepared by the reaction of an unsaturated nitrile with a 1,3- or 2,4-alkane-diol or an oxetane; they are represented by the formula wherein $R^{1-6}$ are as described above. The hydrolysis is conveniently carried out in alkaline solution in a suitable polar organic solvent such as an alcohol, ketone, ether, or the like. The reaction temperature is ordinarily about 50–100° C.

The preparation of the N-3-hydroxyalkyl acrylamides is illustrated by the following examples.

EXAMPLE 1

To a solution of 4070 grams (24 moles) of N-(1,1-dimethyl-3-oxobutyl)acrylamide (diacetone acrylamide) in about 6000 grams of methanol is added a solution of sodium methoxide prepared from 54 grams (2.4 moles) of sodium in about 144 parts of methanol. (A total of 192 moles of methanol is used.) The resulting solution is heated under reflux for 6½ hours, and then 120 grams of sulfuric acid is added, followed by a few grams of acetic acid to neutralize the mixture. The methanolic solution is filtered and the methanol is removed by distillation under reduced pressure. There is obtained 4535.8 grams (94% of the theoretical amount) of N-(1,1-dimethyl-3-oxobutyl)-3-methoxy-propionamide. The product is a clear liquid.

A solution of 490 grams of N-(1,1-dimethyl-3-oxobutyl)-3-methoxypropionamide in 320 grams of methanol is purged with nitrogen, and 28.2 parts of Raney nickel is added. The mixture is pressurized with hydrogen in an autoclave at 1150 p.s.i. and heated to 49° C., and then to 72° C. over 45 minutes. After heating at 72° C. for an additional 3½ hours, with periodic restoration of the 1150 p.s.i. hydrogen pressure, the Raney nickel is removed by filtration and the methanol is stripped. There is obtained 475 grams of N-(1,1-dimethyl-3-hydroxybutyl)-3-methoxypropionamide, which is allowed to drip onto sodium hydroxide pellets heated at 160–170° C. in a glass tube which has been evacuated to a pressure of 30 mm. The system is maintained under nitrogen during the reaction. There is obtained a 98% yield of N-(1,1-dimethyl-3-hydroxybutyl)acrylamide.

EXAMPLE 2

The procedure of Example 1 is repeated, except that the diacetone acrylamide is replaced by an equimolar amount of N-(1,3-diphenyl-1-methyl-3-oxopropyl)acrylamide. The product is N-(1,3-diphenyl-1-methyl-3-hydroxypropyl)acrylamide.

EXAMPLE 3

A solution of 338 grams (2 moles) of diacetone acrylamide and 224 grams (1.1 mole) of aluminum isopropoxide in 350 ml. of isopropyl alcohol is heated in a reaction vessel fitted with a distillation column. Distillate is removed slowly and tested for the presence of acetone. After 150 ml. of distillate has been collected, an additional 50 ml. of isopropyl alcohol is added, and nine further 50-ml. increments are added during the 28-hour distillation period. At the end of this time, a negative test for acetone is obtained on the distillate. The solution is then cooled to room temperature, and 280 ml. of concentrated hydrochloric acid and 500 ml. of water are added. The solution is extracted with five 200-ml. portions of benzene and the benzene solution is dried over calcium sulfate and distilled. The desired N-(1,1-dimethyl-3-hydroxybutyl)acrylamide is obtained as the distillate.

EXAMPLE 4

A mixture of 5 grams of 2-vinyl-4,4,6-trimethyl-5,6-dihydro-1,3-oxazine, 25 grams of dioxane, 25 ml. of water, 2.5 ml. of 20% aqueous sodium hydroxide solution, and 0.1 gram of N-phenyl-β-naphthylamine (as a polymerization inhibitor) is purged with nitrogen and heated to 80° C., with stirring, for 7 hours. Upon neutralization of the reaction mixture and removal of the volatile materials, there is obtained an 88% yield of the desired N-(1,1-dimethyl-3-hydroxybutyl)acrylamide.

EXAMPLE 5

A mixture of 10 grams of 2-vinyl-4,4,6-trimethyl-5,6-dihydro-1,3-oxazine, 35 grams of tertiary butyl alcohol, 25 grams of water, 1 ml. of 20% sodium hydroxide and 0.1 gram of N-phenyl-β-naphthylamine is heated to 80° C., with stirring, for 7½ hours. Upon neutralization of the reaction mixture and removal of the solvents, there is obtained a 62.5% yield of N-(1,1-dimethyl-3-hydroxybutyl)acrylamide.

EXAMPLE 6

To a solution of 2.5 grams of sodium borohydride in 100 ml. of water is added, over a ½ hour period, 42.3 grams of diacetone acrylamide. The reaction is exothermic and the temperature rises to about 40° C. during the addition. The mixture is stirred for one hour, and is then saturated with sodium chloride and extracted with five 100-ml. portions of chloroform. The extracts are combined and dried over calcium chloride, and the chloroform is stripped to yield 41.3 grams of a viscous liquid. Upon distillation of this liquid, there is obtained 27.3 grams of N-(1,1-dimethyl - 3 - hydroxybutyl)acrylamide boiling at 135–140° C./1.5 mm.

EXAMPLE 7

To a solution of 25 grams of N-(1,1-dimethyl-3-oxobutyl)methacrylamide (diacetone methacrylamide) in 225 grams of ethanol is added, with stirring, 4 grams of sodium borohydride. An exothermic reaction occurs which causes the temperature of the mixture to rise to 50° C. The mixture is stirred for 7 hours and filtered, and the ethanol is removed from the filtrate by evaporation. Water is added to the residue which is then extracted with chloroform; the chloroform extracts are dried and the chloroform is removed by vacuum distillation. The product, N-(1,1-dimethyl-3-hydroxybutyl)methacrylamide, is obtained boiling at 100–102° C./0.1 mm. The yield is 20 grams, or 87% of the theoretical amount.

THE POLYMERS

The N-3-hydroxyalkyl acrylamides are readily polymerized under free-radical or anionic conditions, either alone or with other monomers. The term "polymer," as used herein, includes homopolymers, copolymers, terpolymers and other interpolymers.

The free-radical method is generally the most convenient one for polymerization of the compounds of this invention. Polymerization by this method may be effected in bulk, solution, suspension or emulsion, by contacting the monomer or monomers with a polymerization initiator either in the absence or presence of a diluent at a temperature of about 0–200° C. Suitable free-radical initiators include benzoyl peroxide, tertiary butyl hydroperoxide, acetyl peroxide, hydrogen peroxide, azobisisobutyronitrile, sodium persulfate, ammonium persulfate, chlorate-sulfite and the like. Solution polymerization may be effected in an organic solvent such as benzene, toluene, cyclohexane, n-hexane, naphtha, tetrahydrofuran, mineral oil or the like; emulsion and suspension polymerization are conveniently effected in water or a mixture of water with a hydroxylated organic solvent.

Suitable emulsifiers for use in the preparation of emulsion polymers of this invention include cationic materials such as stearyl dimethyl benzyl ammonium chloride; nonionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose; gum arabic, dextrins or polyvinyl alcohol. Depending on the use to which the polymer is to be put, a particular emulsifier may be preferred; for example, polyvinyl alcohol is incompatible with borax and so some other emulsifier should be used when the polymer is intended as a constituent for a paint to be applied to drywall or the like, which contains borated dextrin.

The compounds of this invention may also be polymerized under anionic conditions using an initiator such as butyllithium or naphthylsodium in tetrahydrofuran, or sodium metal in liquid ammonia.

A large variety of monomers can be used to form interpolymers with the N-3-hydroxyalkyl acrylamides of this invention. For the most part, these monomers are polymerizable vinyl compounds. They include (1) esters of unsaturated alcohols, (2) esters of unsaturated acids, (3) esters of unsaturated polyhydric alcohols (e.g., butenediol), (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

(1) Esters of unsaturated alcohols: Allyl, methallyl, crotlyl, 1-chloroallyl, 2-choroallyl, cinnamyl, vinyl, methylvinyl, 1-phenallyl, butenyl esters of (a) saturated acids such as acetic, propionic, butyric, valeric, caproic and stearic; (b) unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; (c) poly-basic acids such as oxalic, malonic, succinic, glutaric adipic, pimelic, suberic, azelaic and sebacic; (d) unsaturated poly-basic acids such as maleic, fumaric, citraconic, mesaconic, itaconic, methylenemalonic, acetylenedicarboxylic and aconitic; (e) aromatic acids, e.g., benzoic, phenylacetic, phthalic, terephthalic and benzoylphthalic acids.

(2) Esters of saturated alcohols, such as methyl, ethyl, propyl, isopropyl, butyl, isobutyl, sec-butyl, ter-butyl, 2-ethylhexyl, cyclohexyl or behenyl alcohols, with unsaturated aliphatic monobasic and polybasic acids, examples of which are illustrated above.

(3) Esters of unsaturated polyhydric alcohols, e.g., butenediol, with saturated and unsaturated aliphatic and aromatic, monobasic and polybasic acids, illustrated examples of which appear above.

(4) Vinyl cyclic compounds including (a) monovinyl aromatic hydrocarbons, e.g., allylbenzene, styrene, o-, m-, p-chlorostyrenes, -bromostyrenes, -fluorostyrenes, -methylstyrenes, -ethylstyrenes, -cyanostyrenes; di-, tri-, and tetra-, etc., -chlorostyrenes, -bromostyrenes, -fluorostyrenes, -methylstyrenes, -ethylstyrenes, -cyanostyrenes; vinylnaphthalene, vinylcyclohexane; (b) corresponding polyvinyl compounds such as divinylbenzene and trivinylbenzene; and (c) vinyl heterocycles such as vinylfuran, vinylpyridine, vinylbenzofuran, N-vinylcarbazole, N-vinylpyrrolidone and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether and allyl ethyl ether.

(6) Unsaturated ketones, e.g., methyl vinyl ketone and ethyl vinyl ketone.

(7) Unsaturated amides, such as acrylamide, methacrylamide, N-methacrylamide, N-phenylacrylamide, N-allylacrylamide, N-methylolacrylamide and N-allylcaprolactam.

(8) Unsaturated aliphatic hydrocarbons, for instance, ethylene, propylene, butenes, butadiene, isoprene, 2-chlorobutadiene and alpha-olefins in general.

(9) Vinyl halides, e.g., vinyl fluoride, vinyl chloride, vinyl bromide, vinylidene chloride, vinylidene bromide, allyl chloride and allyl bromide.

(10) Unsaturated acids (for example, acrylic, methacrylic, propylacrylic), examples of which appear above.

(11) Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

(12) Unsaturated acid halides such as cinnamoyl, acrylyl, methacrylyl, crotonyl, oleyl and fumaryl chlorides or bromides.

(13) Unsaturated nitriles, e.g., arcylonitrile, methacrylonitrile and other substituted acrylonitriles.

The relative proportions of the N-3-hydroxyalkyl acrylamides and the comonomers to be used in interpolymerization depend upon the reactivity of these monomers as well as the properties desired for the interpolymers being formed. To illustrate, interpolymers in which rigidity is desired are obtained by polymerization of a mixture of monomers having a few substitutions or substitutions of relatively short chain lengths. If a still higher degree of rigidity is desired, a monomer mixture may be used in which a small amount of a bifunctional monomer is included such as divinylbenzene which will crosslink the polymer. On the other hand, interpolymers having a high degree of solubility in a hydrocarbon oil are obtained from a polymerization mixture containing a relatively high proportion of an oil-solubilizing monomer, i.e., one having an aliphatic group containing at least about 8 carbon atoms. For most applications, it has been found that the oil-solubilizing monomer should comprise at least about 50% (by weight), preferably at least about 75%, of the interpolymer.

Polymers according to this invention may also be prepared by the reduction of polymers of N-3-oxohydrocarbon-substituted acrylamides. The reduction method may be any one which will reduce the carbonyl group; the use of sodium borohydride is preferred. When a diacetone acrylamide homopolymer is thus reduced, the product may be a homopolymer of N-(1,1-dimethyl-3-hydroxybutyl)acrylamide or a "copolymer" with diacetone acrylamide, depending on the degree of completion of the reduction.

The preparation of polymers of this invention is illustrated by the following examples.

EXAMPLE 8

A solution of 2 grams of sodium borohydride in 50 ml. of methanol is added dropwise, over 10 minutes, to a solution of 20 grams of a diacetone acrylamide polymer in 350 ml. of methanol. The reaction is exothermic and the temperature rises to about 40° C. The mixture is heated under reflux for two hours and then cooled, after which another gram of sodium borohydride is added and refluxing is continued for two hours. Acetic acid is added to neutralize the mixture, which is then filtered and added dropwise to 5 liters of water. The N-(1,1-dimethyl-3-hydroxybutyl)acrylamide polymer precipitates an is removed by filtration and dried in air for 3 days.

EXAMPLE 9

A polymer of diacetone methacrylamide is prepared by reacting 25 grams of diacetone methacrylamide in 100 grams of benzene with 0.025 grams of azobisisobutyronitrile. The polymer is isolated by precipitation from textile spirits and dissolved in 100 grams of ethanol. Sodium borohydride, 3 grams, is added and the mixture is stirred for 18 hours. The resulting polymer of N-(1,1-dimethyl-3-hydroxybutyl)methacrylamide is isolated by precipitation from water, filtered and dried 40° C. in a vacuum oven.

EXAMPLE 10

By the method of Example 8, 25 grams of a copolymer of 73% diacetone acrylamide and 27% ethyl acrylate is reduced with 2 grams of sodium borohydride. The reaction is carried out in solution in 650 ml. of ethanol. The product is a copolymer of N-(1,1-dimethyl-3-hydroxybutyl)acrylamide and ethyl acrylate.

EXAMPLE 11

A copolymer of equal amounts of diacetone acrylamide and diacetone methacrylamide is prepared in aqueous emulsion, using an ammonium persulfate-sidium persulfate catalyst and an oxyethylated alkylbenzene dispersing agent. To a solution of 45 grams of this copolymer in 500 ml. of ethanol is added a suspension of 4.9 grams of sodium borohydride in 100 ml. of ethanol. The reaction mixture is allowed to stand overnight and is then acidified with glacial acetic acid to a pH of 7. The resulting copolymer is precipitated by pouring into a tenfold exces of water and is then dried.

EXAMPLE 12

Following the procedure of Example 11, a polymer is prepared by sodium borohydride reduction of a 60:40 copolymer of diacetone acrylamide and diacetone methacrylamide.

EXAMPLE 13

A solution of 100 grams of N-(1,1-dimethyl-3-hydroxybutyl)acrylamide in 400 grams of benzene is heated to reflux and purged with nitrogen, after which a solution of 2 grams of azobisisobutyronitrile in 40 ml. of benzene is added. The polymerization reaction begins immediately, and the mixture is stirred and cooled to room temperature. The orange gel-like homopolymer is agitated with heptane and dried in a vacuum oven. It is then purified by dissolving in 2.5 liters of methanol and reprecipitating from 7 liters of water. The purified polymer is removed by filtration and air-dried.

EXAMPLE 14

A solution of 200 grams of N-(1,1-dimethyl-3-hydroxybutyl)acrylamide, 2 grams of ammonium persulfate and 2 grams of sodium persulfate in 2000 grams of distilled water is agitated for one hour, during which time the desired homopolymer precipitates. It is removed by filtration, washed with water and dried in a vacuum oven at 58° C.

EXAMPLE 15

A solution of 10 grams of N-(1,1-dimethyl-3-hydroxybutyl)acrylamide, 0.1 gram of sodium lauryl sulfate and 0.2 gram each of ammonium persulfate and sodium persulfate in 90 grams of water is heated to 60° C. with stirring for three hours. Polymerization occurs and an aqueous latex is formed. The latex can be broken by the addition of a few drops of 10% aqueous hydrochloric acid, whereupon the polymer precipitates and may be collected by filtration.

EXAMPLE 16

A solution of 90 grams of vinyl acetate in 386 ml. of benzene is heated to 79° C., and a solution of 2.5 grams of azobisisobutyronitrile in 50 ml. of benzene is added. After the mixture has been heated for 35 minutes, a solution of 10 grams of N-(1,1-dimethyl-3-hydroxybutyl)-acrylamide in 57 ml. of benzene is added dropwise over one hour. Stirring and heating is continued for one hour, after which time 100 ml. of methanol is added and the mixture is cooled. The 1:9 copolymer of N-(1,1-dimethyl-3-hydroxybutyl(acrylamide and vinyl acetate is precipitated by adding to 6 liters of textile spirits, dissolved in ethanol and reprecipitated by the addition of water. An emulsion is formed when the water is added; this emulsion is broken by the addition of 100 grams of sodium chloride and 20 ml. of hydrochloric acid. After an additional precipitation from aqueous ethanol, the copolymer is dried in a vacuum oven at 60° C.

EXAMPLE 17

A 1:1 copolymer of vinyl acetate and N-(1,1-dimethyl-3-hydroxybutyl)acrylamide is prepared by the method of Example 16, using 50 grams of vinyl acetate, 50 grams of N-(1,1-dimethyl-3-hydroxybutyl)acrylamide, 2 grams of azobisisobutyronitrile and 400 ml. of benzene.

EXAMPLE 18

Following the procedure of Example 16, a 3:1 copolymer of N-(1,1-dimethyl-3-hydroxybutyl)acrylamide and vinyl acetate is prepared from 25 grams of vinyl acetate, 75 grams of N-(1,1-dimethyl-3-hydroxybutyl)acrylamide, 0.2 gram of azobisisobutyronitrile and 400 grams of benzene.

EXAMPLE 19

Following the procedure of Example 16, a 9:1 copolymer of N-(1,1-dimethyl-3-hydroxybutyl)acrylamide and vinyl acetate is prepared from 5 grams of vinyl acetate, 45 grams of N(1,1-dimethyl-3-hydroxybutyl) acrylamide, 0.2 gram of azobisisobutyronitrile and 400 grams of benzene.

EXAMPLE 20

A solution of 5 grams of N-(1,1-dimethyl-3-hydroxybutyl)acrylamide, 45 grams of vinyl acetate, 0.5 gram of ammonium persulfate and 0.5 gram of sodium persulfate in 200 grams of water is stirred at room temperature for one hour. The polymerization reaction is then quenched by the addition of hydroquinone. The polymer emulsion which is forced is broken by freezing and the desired 1:9 copolymer of N-(1,1-dimethyl-3-hydroxybutyl)acrylamide and vinyl acetate is removed by filtration and dried in a vacuum oven.

EXAMPLE 21

Following the procedure of Example 20, a 1:1 copolymer of N-(1,1-dimethyl-3-hydroxybutyl)acrylamide and vinyl acetate is prepared from 10 grams of each of the monomers, 0.2 grams each of ammonium persulfate and sodium persulfate and 80 grams of water.

EXAMPLE 22

To a solution of 225 grams of N-(1,1-dimethyl-3-hydroxybutyl)acrylamide and 0.25 gram of azobisisobutyronitrile in 2500 grams of benzene is added dropwise, over 5 minutes, 25 grams of ethyl acrylate. The solution is heated under reflux during the addition; agel forms as the ethyl acrylate is added. The gel is dissolved in acetone and precipitated with water, yielding a 9:1 copolymer of N-(1,1-dimethyl-3-hydroxybutyl)acrylamide and ethyl acrylate which is filtered and dried in a vacuum oven.

EXAMPLE 23

A mixture of 45 grams of N-(1,1-dimethyl-3-hydroxybutyl)acrylamide, 5 grams of ethyl acrylate, 0.5 gram each of sodium persulfate and ammonium persulfate and 200 grams of water is stirred at room temperature for one-half hour. The desired 9:1 copolymer of N-(1,1-dimethyl-3-hydroxybutyl) acrylamide and ethyl acrylate precipitates and is removed by filtration and dried in a vacuum oven.

EXAMPLE 24

A mixture of 5 grams of ethyl acrylate, 0.25 gram of sodium lauryl sulfate and 400 grams of water is heated to 60° C. and a solution of 0.25 gram of ammonium persulfate in 5 ml. of water is added. After polymerization has proceeded for one-half hour, a solution of 45 grams of N-(1,1-dimethyl-3-hydroxy-butyl)acrylamide in 45 grams of water is added over 15 minutes. The mixture is heated at 60° C. and stirred for an additional two hours; a latex is formed which breaks at the end of this time to yield the desired 9:1 copolymer of N-(1,1-dimethyl-3-hydroxybutyl)acrylamide and ethyl acrylate. This polymer is filtered, washed with water and dried in a vacuum oven.

EXAMPLE 25

A solution of 37.5 grams of N-(1,1-dimethyl-3-hydroxybutyl)acrylamide and 12.5 grams of styrene in 950 grams of benzene is heated to reflux and 0.5 gram of azobisisobutyronitrile is added. Refluxing is continued for seven hours as the desired 3:1 copolymer of N-(1,1-dimethyl-3-hydroxybutyl)acrylamide and styrene is formed. The benzene solution is cooled and poured into heptane, whereupon the copolymer precipitates and is collected by filtration and dried.

EXAMPLE 26

Following the procedure of Example 25, a 1:1 copolymer of N-(1,1-dimethyl-3-hydroxybutyl)acrylamide and styrene is prepared.

EXAMPLE 27

A solution of 37.5 grams of N-(1,1-dimethyl-3-hydroxybutyl)acrylamide, 12.5 grams of acrylic acid and 0.5 gram each of ammonium persulfate and sodium persulfate in 200 grams of water is stirred at room temperature for about one-half hour. The 3:1 copolymer of N-(1,1-dimethyl-3-hydroxybutyl)acrylamide and acrylic acid is removed by decantation; the polymer is cut into small pieces, washed with water and dried in a vacuum oven.

EXAMPLE 28

A solution of 47.5 grams of N-(1,1-dimethyl-3-hydroxybutyl)acrylamide and 2.5 grams of glycidyl methacrylate in 500 grams of benzene is heated to 50° C. and 0.05 gram of azobisisobutyronitrile is added. Polymer formation is evidenced by the formation of a gel within four hours. The gel is dissolved in acetone and precipitated by the addition of water; the precipitate, which is the desired 19:1 copolymer of N-(1,1-dimethyl-3-hydroxybutyl)acrylamide and glycidyl methacrylate, is dried in a vacuum oven.

EXAMPLE 29

Isobutyraldehyde, 144 grams (2 moles), is added at −20° C. to a solution of 160 grams (2 moles) of sulfur trioxide in 352 grams of dioxane and 750 ml. of ethylene dichloride. The reaction mixture is allowed to warm to room temperature and stirred for one hour, after which 2190 grams (30 moles) of acrylonitrile and 294 grams 3 moles) of sulfuric acid are added. An exothermic reaction occurs and the temperature of the reaction mixture is maintained at 40° C. until the reaction is complete. The mixture is then cooled to 0° C. and treated with sufficient anhydrous ammonia to neutralize the sulfonic acid formed. Upon dilution with ethylene dichloride, the ammonium salt of 1,1-bis(acrylamido)-2-methylpropyl-2-sulfonic acid is precipitated. The solid product is filtered and dissolved in methanol; the methanol solution is filtered and the methanol is removed by evaporation. The purified salt is washed with acetone and ether and dried in a vacuum oven.

A solution of 2 grams of the acrylamidosulfonate, 18 grams of N-(1,1-dimethyl-3-hydroxybutyl)acrylamide and 0.005 gram of azobisisobutyronitrile in 80 grams of methanol is heated to reflux for 2 hours, whereupon a yellowish gel forms. This gel, the desired 9:1 copolymer of N-(1,1-dimethyl-3-hydroxybutyl)acrylamide and ammonium 1,1-bis(acrylamido)-2-methylpropyl-2-sulfonate, is washed with acetone in a Waring blender and dried in a vacuum oven.

The polymers of this invention have a wire variety of uses. A property of N-3-hydroxyalkyl acrylamide polymers which contributes to the diversity of their uses is "breathability"; that is, their high porosity to water vapor and gas. This property is accompanied, however, by resistance to chemical and physical attack.

The polymers may be combined with pigments, fillers, dyes, extenders, emulsifiers and solvents of various kinds to form inks, paints and the like; or they may be used to increase the gloss of commercial semi-gloss paints such as alkyd paints. Many of the polymers, when prepared in latex form, serve as thickeners for water systems, including water-base paints.

The polymers may be formulated into thermoplastic or pressure-sensitive adhesives, depending on whether it contains relatively little or a larger amount, respectively, of a plasticizer or plasticizing comonomer.

Powders suitable for molding and coating formation may be obtained by precipitation or spray-drying of the polymers of this invention, especially from latices. For this purpose, it is preferred that the soap or emulsifier content of the latex be kept very low.

Oil-soluble polymers of this invention, especially copolymers containing at least about 50% by weight of units derived from an oil-solubilizing comonomer such as an alkyl acrylate having at least about eight carbon atoms, improve the viscosity properties of lubricants. Other uses include fiber formation; protective coatings for photographs, preserved plants, etc.; soil binders for airplane landing strips; sizing compositions for fiberglass mat formation; preparation of sheeting for water-repellent garments and coverings such as upholstery and raincoats; produce wrap for foods requiring a semi-permeable package; treatment of leather in shoes, gloves and the like; and formation of magnetic recording tapes by suspension of iron oxide in a latex and formation of a film thereof on a polyester or cellulose acetate backing.

FILMS

Many of the uses of N-3-hydroxyalkyl acrylamide polymers involve the preparation of films or sheets therefrom. (The terms "film" and "sheet," as used in the polymer art, respectively denote fabrications having a thickness of up to 10 mils and greater than 10 mils; for the sake of brevity, the use of the word "film" hereinafter will include both films and sheets.) The preparation of films may be accomplished by simply applying a latex of the polymer to a surface (e.g., by brushing, roller-coating or dip-coating) and allowing it to dry. Films may also be prepared from bulk, solution, suspension or emulsion polymers; the preparation of such films is often conveniently effected by dissolving the polymer in a suitable solvent and casting on a flat surface.

The casting solvent for film formation may be any organic liquid which dissolves the polymer and which may itself be easily removed when the film has been formed. Suitable solvents include aliphatic alcohols, ketones, ethers, esters and the like; aromatic hydrocarbons such as benzene, toluene and xylene; and halogenated aromatic compounds such as chlorobenzene or o-chlorotoluene.

The polymer film is prepared by casting the polymer solution on a suitable surface such as glass or cellophane, the thickness of the solution being on the order of 1–5 mils, and allowing the solvent to evaporate. In some cases, evaporation of the solvent may be aided by gentle heating. The film is then released from the casting surface by a suitable method, typically by immersing the surface and film in water.

Films and sheets of the polymers of this invention may also be prepared by extrusion, injection molding or similar methods; these are frequently more suitable than casting for producing such films commercially.

It is frequently advantageous to incorporate an auxiliary swelling agent in the casting solution. A film prepared from such a solution containing an auxiliary swelling agent often possesses improved properties as a desalination membrane, as hereinafter described. Particularly useful swelling agents for this purpose include perchlorates, especially magnesium perchlorate, and lower molecular weight amides such as formamide, dimethylformamide and acetamide.

The properties of the films may often also be improved by heating them at about 50–150° C., at atmospheric or elevated pressures.

The preparation of films from the polymers of this invention is illustrated by the following examples.

EXAMPLE 30

A solution of 7 grams of the N-(1,1-dimethyl-3-hydroxybutyl)acrylamide homopolymer of Example 15 in 100 grams of methyl ethyl ketone is cast on a glass plate. The film is allowed to dry overnight to form a 0.7-mil film which is heated at 70–75° C., for one hour and soaked in water for two hours, after which time it is removed from the glass plate.

EXAMPLE 31

A solution of 10 grams of the copolymer of Example 10 in 45 grams each of methyl ethyl ketone and dimethylformamide is cast on a glass surface and allowed to dry. The film thus formed (1 mil) is heated and soaked in water as described in Example 26, and is then removed from the glass plate.

EXAMPLE 32

A solution of 15 grams of the N-(1,1-dimethyl-3-hydroxybutyl)acrylamide-vinyl acetate copolymer of Example 18 in 85 grams of acetone is cast on a glass plate and allowed to dry. The resulting film is heated and soaked in water as described in Example 26. The final film thickness is 1 mil.

EXAMPLE 33

A solution of 20 grams of the N-(1,1-dimethyl-3-hydroxybutyl)acrylamide homopolymer of Example 13 and 0.2 gram of magnesium perchlorate in 2 grams of water and 80 grams of acetone is cast on a glass plate and allowed to dry to form a 1.1-mil film. This film is released from the glass plate by soaking in water and is then heated at 60° C. for 15 minutes.

EXAMPLE 34

A solution of 20 grams of the homopolymer of Example 13 in 30 grams of formamide and 80 grams of acetone is cast on a glass plate and dried to form a 1.5-mil film. The film is released by soaking in water and is then heated for 15 minutes at 40° C.

CROSSLINKED POLYMERS

Polymers of the N-3-hydroxyalkyl acrylamides of this invention may be crosslinked to form polymeric compositions with increased strength, rigidity and resistance to chemical attack.

Two types of crosslinking agents may be used to form the crosslinked polymers of this invention. The first type reacts with the polymer to induce mutually reactive sites on the polymer molecule, thereby causing the formation of a direct valence bond between at least two of said molecules. The mutually reactive sites may be on the polymer chain itself or on the substituent groups. If they are on the chain, they are most conveniently formed by a free radical catalyst and consist of free radicals which may react with each other as described. If the sites are on the substituent groups, they may be formed by any reagent which will create on the substituent a moiety capable of reaching with a similar moiety or with another one which is present in the molecule. In general, the term "mutually reactive site" denotes a potential point where at least two polymer molecules can be connected by a valence bond which does not involve atoms extraneous to the polymer being crosslinked.

The second type of crosslinking agent reacts with a plurality of polymer molecules to form a molecular bridge between them. By "molecular bridge" is meant a linkage containing at least one atom extraneous to the polymer itself. The molecular bridge may be organic or inorganic and may be attached to the polymer chain or the substituent, more often the latter.

It will be apparent that the variety of reagents which can be used for crosslinking, especially of the second type described above, is very wide; it includes, in a broad sense, any compound having at least two functional groups which react with an active site on the polymer molecule, usually the hydroxy radical. The preferred classes of compounds of this type are polyisocyanates, aldehydes (in acid medium), oxidizing agents and polycarboxylic acid derivatives. Also useful for crosslinking copolymers containing acidic groups (e.g., acrylic acid-containing interpolymers) are polyvalent metal salts or oxides.

Oxidizing agents are believed to function by oxidizing the terminal methyl group to a carboxylic acid group which may then form a salt with the oxidizing agent or its reduction product. The oxidizing agent may also serve as a crosslinker of the first type by forming an acid which in turn condenses with another acid group to form an anhydride. Chromium trioxide is the preferred oxidizing agent, but other suitable oxidizers include potassium permanganate and potassium perchlorate.

Polyisocyanates react with the hydroxy groups of two (or more) polymer molecules to form a polyfunctional urethane bridge. Polycarboxylic acid derivatives (preferably the acid halides or anhydrides) similarly react to form a polyfunctional ester bridge. Typical crosslinking agents of these types include toluene diisocyanate, succinyl chloride, succinic anhydride, glutaryl chloride and adipyl chloride. Treatment of the polymers with monocarboxylic acid halides also results in modification which, in certain instances, improves desalination and other properties of the films. It is believed that, in addition to esterifying the alcoholic hydroxyl groups, these acid halides cause dehydrative cyclization of the pendant chains on the polymer molecule to form an oxazine moiety as follows [using an N - (1,1 - dimethyl-3-hydroxybutyl)acrylamide polymer as illustrated].

The same reaction occurs when the polymer is treated with other dehydrating agents such as phosgene, sulfuric acid, alumina, phosphorus pentoxide and the like. Aldehydes (preferably formaldehyde) react, in actd solution, with the hydroxy groups of two polymer molecules to form an acetal bridge.

The use of polyvalent metal salts or oxides for crosslinking is often advantageous when the polymer contains acidic units, such as those derived from acrylic acid. The reaction of the metal oxide or salt with the polymer may be one of neutralization of the acidic groups, or one of double decomposition of a salt thereof.

Of the crosslinking agents of the first type, the preferred species are the free radical catalysts. These include benzoyl peroxide, lauroyl peroxide, azobisisobutyronitrile and the like. They are believed to function by creating free radical sites on the polymer chain, thereby causing condensation to form a cross-linked structure.

The crosslinking methods described hereinabove may be used on the polymers themselves, in bulk or in particulate form. Most often, however, they are useful for treatment of polymer films. For this purpose, a film of the desired polymer is treated with a crosslinking agent, optionally in a solvent or diluent, at a temperature at which reaction occurs (ordinarily from room temperature up to about 100° C.).

Films, both simple and crosslinked, of N-3-hydroxyalkyl acrylamide polymers have excellent tensile strength and elongation properties. They may be used as oil-resistant coatings on paper, as breathable protective coatings on fabrics, or as protective coatings on woods such as plywood.

The preparation of crosslinked and otherwise post-treated polymers and polymer films of this invention is illustrated by the following examples.

EXAMPLE 35

A 1-mil film of the polymer of Example 8 is prepared by casting an acetone-dimethylformamide solution of the polymer on glass and heating at 70–75° C. for 1 hour. The film is then soaked in a 10% solution of toluene diisocyanate in xylene for 1 hour, rinsed with xylene and blotted dry. The crosslinked film is soaked in water for 48 hours and removed from the glass plate.

EXAMPLE 36

The N-(1,1-dimethyl-3-hydroxybutyl)acrylamide-ethyl acrylate copolymer of Example 24 is dissolved in a mixture of dimethylformamide and acetone and a film thereof is cast on glass. Following a procedure similar to that of Example 35, an 0.5-mil toluene diisocyanate-crosslinked film is prepared by treating the film with a 2.5% solution of toluene diisocyanate in xylene.

EXAMPLE 37

A film of an N-(1,1-dimethyl-3-hydroxybutyl)acrylamide-vinyl acetate copolymer is prepared from the casting solution described in Example 32, dried 30 minutes and soaked for 45 minutes at 50° C. in a solution of 300 ml. of 37% aqueous formaldehyde and 100 ml. of sulfuric acid in 1 liter of water. The crosslinked film is then soaked in water for 10 minutes, released from the glass surface and heated between two chrome plates to 80° C. under 2000 p.s.i.g. pressure for 45 minutes. The final film thickness is 1 mil.

EXAMPLE 38

Following the procedure of Example 37, a film of the N-(1,1 - dimethyl-hydroxybutyl)acrylamide-vinyl acetate copolymer of Example 19 is cast on glass. The film is dried for ½ hour, heated at 75° C. for one hour and released by soaking in warm water. It is then submerged in a solution of 100 ml. of 37% aqueous formaldehyde and 10 ml. of sulfuric acid in 100 ml. of distilled water, at 50° C. for one hour. The crosslinked film (0.9 mil) is rinsed for ½ hour in water.

EXAMPLE 39

To a solution of 25 grams of the N-(1,1-dimethyl-3-hydroxybutyl)acrylamide-vinyl acetate copolymer of Example 19 in 75 grams of acetone are added 20 grams of dimethylformamide and 0.25 gram of adipyl chloride. The solution is shaken for one hour, allowed to stand for 15 minutes and cast on glass. The film is allowed to dry for 10 minutes, soaked in water for 2½ days and then heated at 50° C. for 15 minutes and released from the glass surface.

EXAMPLE 40

Following the procedure of Example 39, 30 grams of the N-(1,1 - dimethyl - 3 - hydroxybutyl)acrylamide homopolymer of Example 14 is dissolved in 170 grams of acetone and 40 grams of dimethylformamide and is crosslinked with 0.3 gram (1% of its weight) of adipyl chloride. A film of the crosslinked polymer is then cast on glass.

EXAMPLE 41

Following the procedure of Example 39, a film is prepared from the homopolymer of Example 14, crosslinked with 2.5% of its weight of adipyl chloride. During the crosslinking reaction, the mixture is agitated ultrasonically for 15 minutes.

EXAMPLE 42

Following the procedure of Example 39, the homopolymer of Example 14 is crosslinked with 5% of its weight of adipyl chloride and a film is prepared therefrom.

EXAMPLE 43

A solution of 20 grams of the polymer of Example 11 and 2 grams of adipyl chloride in 80 grams of acetone and 16 grams of dimethylformamide is heated for 2 hours at 65–70° C. and allowed to cool to room temperature. A 10-mil film of the product is cast on glass, dried for 3 minutes, immersed in water for 15 minutes at 60–65° C. and removed from the glass surface.

EXAMPLE 44

Following the procedure of Example 43, a crosslinked film is prepared from 20 grams of the polymer of Example 11, 3 grams of adipyl chloride, 80 grams of acetone and 8 grams of dimethylformamide.

EXAMPLE 45

Following the procedure of Example 43, a crosslinked film is prepared from 20 grams of the polymer of Example 12, 1 gram of adipyl chloride, 100 grams of acetone and 20 grams of dimethylformamide.

EXAMPLE 46

To a solution of 17.1 grams of the homopolymer of Example 14 and 7.9 grams of pyridine in 132 grams of acetone is added dropwise 11.8 grams of acetyl chloride. The mixture is stirred for two hours, and then the pyridine hydrochloride which forms is removed by filtration and the post-treated polymer is recovered by pouring the acetone solution into heptane. The polymer is washed with an aqueous sodium bicarbonate solution and dried in a vacuum oven.

EXAMPLE 47

Succinyl chloride, 5 grams, is added dropwise to a solution of 8.55 grams of the homopolymer of Example 14 and 2 grams of pyridine in 60 grams of acetone. The mixture is stirred for two hours, whereupon it forms a gel. Stirring of the gel is continued for slightly more than one hour, and the mixture is then allowed to stand for 2½ days whereupon a white solid separates by precipitation. The mixture is filtered and the solid, crosslinked polymer is washed with an aqueous solution of sodium bicarbonate and dried in a vacuum oven.

EXAMPLE 48

Following the procedure of Example 46, 8.55 grams of the homopolymer of Example 14 is crosslinked with 5.1 grams of phthalyl chloride in 64 grams of acetone and 2 grams of pyridine.

EXAMPLE 49

Following the procedure of Example 46, 8.55 grams of the homopolymer of Example 14 is dissolved in 70 grams of acetone and 4 grams of pyridine and is crosslinked with 5.2 grams of isophthalyl chloride.

EXAMPLE 50

Glutaryl chloride, 4.2 grams, is added dropwise to a solution of 8.55 grams of the homopolymer of Example 14 in 61 grams of acetone and 4 grams of pyridine. The reaction mixture forms a gel in 30 seconds; the gel is washed with aqueous sodium bicarbonate solution and agitated with heptane in a blender. The polymer is removed by filtration and dried.

EXAMPLE 51

To a solution of 8.55 grams of the homopolymer of Example 14 in 60 grams of acetone is added dropwise 3.2 grams of oxalyl chloride. The reaction mixture forms a gel in 30 seconds; the gel is washed with aqueous sodium bicarbonate and agitated with heptane in a blender. The polymer is removed by filtration and dried at 50° C. in a vacuum oven.

EXAMPLE 52

Following the procedure of Example 51, 8.55 grams of the homopolymer of Example 14 is crosslinked with 3.5 grams of malonyl chloride.

DESALINATION OF WATER

General mention has been made of the high water vapor and gas transmission rates of the polymers of this invention. Accordingly, these polymers are useful wherever a "breathable" or semi-permeable film is desirable. Typical applications include formation of membranes for use in equipment designed to supplement bodily functions, such as artificial kidneys; in purification of chemical products, both aqueous and non-aqueous; and in removal of dissolved impurities, especially salt, from water by hyperfiltration.

The problem of removal of dissolved impurities from water, especially conversion of saline water into potable water, is currently a subject of great interest. Consumption of fresh water in metropolitan areas is often so high that existing water supplies are insufficient to meet the demand. Water shortages of varying degrees of severity have resulted in several parts of the country. In view of the dwindling sources of fresh water and the vast supply of sea water and brackish water which has so far been unusable, the potential importance of methods for desalinating such water is obvious.

Some of the methods which have been proposed for desalination are distillation, crystallization, solvent extraction, ion exchange, electrodialysis, and hyperfiltration or reverse osmosis. The last of these is of great interest because it is potentially the most efficient and economical way of accomplishing desalination. Basically, the process is one in which water containing dissolved impurities is forced under pressure through a membrane which generally passes water more readily than it passes the impurities. It differs from electrodialysis, the other important membrane method, in that water is removed from salt rather than salt from water and that the driving force is pressure rather than electrical potential.

In the present specification, the term "hyperfiltration" is used to refer to any process in which low molecular weight solutes, which are generally inorganic but may include certain organic molecules and also bacteria or viruses in certain instances, are removed from water under pressure by passage through a membrane. The term "reverse osmosis" is often applied to this process because of the commonly held belief that to effect flow of water through the membrane at least enough pressure must be exerted to overcome the osmotic pressure of the solution. This view is not actually correct since all that is really necessary is to overcome the difference between the osmotic pressures of the feed and product solutions. This difference depends on the water flux through the membrane and varies between zero (at negligible flow) and an upper limit which is determined by the characteristics of the membrane.

The following terms are frequently used in discussions of the hyperfiltration process.

"Flux" is the quantity of a substance passing through a surface of unit area during unit time. In particular, "water flux" is the amount of water which passes through a surface, such as a membrane, of unit area during unit time.

"Salt rejection" is the amount of the salt rejected by a desalination membrane, and is defined as the difference between the salt concentration of the influent and that of the effluent divided by the salt concentration of the influent.

"Water vapor transmission rate" is the amount of water passing through a membrane of unit area and unit thickness within a given time. It has been found that there is a direct correlation between water vapor transmission rate and the solubility of water in the membrane, and hence between transmission rate and the ability of the membrane to function in the hyperfiltration process.

Three properties are essential for a good desalination membrane. First, the polymer comprising the membrane must be hydrophilic. Second, the membrane must have sites for hydrogen bonding. Third, the membrane must exhibit a high permeability of water relative to salt. A fourth property previously considered necessary was a crosslinked or highly crystalline structure in the membrane; however, it has been discovered that membranes prepared from the polymers of this invention need not be chemically crosslinked, although such crosslinking is often desirable.

The polymeric substance which has heretofore been most widely used for the preparation of membranes for desalination by hyperfiltration is cellulose acetate. Films of cellulose acetate are highly hydrophilic and capable of forming hydrogen bonds, but they suffer from a number of disadvantages. First, they are low in strength and durability, especially when in contact with solutions high in salt. Second, they require special processing to be usable as desalination membranes. Third, they must be kept continuously in contact with water after processing.

Membranes of the N-3-hydroxyalkyl acrylamide polymers of this invention are free of these disadvantages. Moreover, they have high water fluxes and salt rejections; this is especially true of membranes prepared from crosslinked polymers.

Several interesting structural correlations with desalination effectiveness of the N-3-hydroxyalkyl acrylamide polymers have been discovered. In the first place, copolymers with oxygen-containing monomers are particularly effective; these oxygen-containing monomers include ethers such as ethyl vinyl ether and methyl 2-butenyl ether, ketones such as methyl vinyl ketone and methyl allyl ketone, and esters such as ethyl acrylate, ethyl methacrylate, vinyl acetate and diethyl maleate. Especially useful are copolymers of N-(1,1-dimethyl-3-hydroxybutyl) acrylamide and its methacrylamide homolog. Copolymers containing about 5–40% (based on total monomer weight) of a polymerizable ester, especially a lower alkyl acrylate or a vinyl carboxylate, are also suitable.

In the second place, polymers which exhibit a high degree of short-range ordering when examined by X-ray diffraction form particularly good desalination membranes. In general, copolymers of N-3-hydroxyalkyl acrylamides with nitrogen- and oxygen-containing monomers show higher short-range ordering than homopolymers; these copolymers include the ones with nitriles such as acrylonitrile and the oxygen-containing ones previously described.

The essential features of a hyperfiltration desalination unit include a pressure cell or vessel for containing the feed (water to be desalinated), circulation means for contacting this water with the membrane, and means for removing the product (desalinated water) on the opposite side of the membrane. A typical unit is shown in the drawings, in which.

Figure 1:
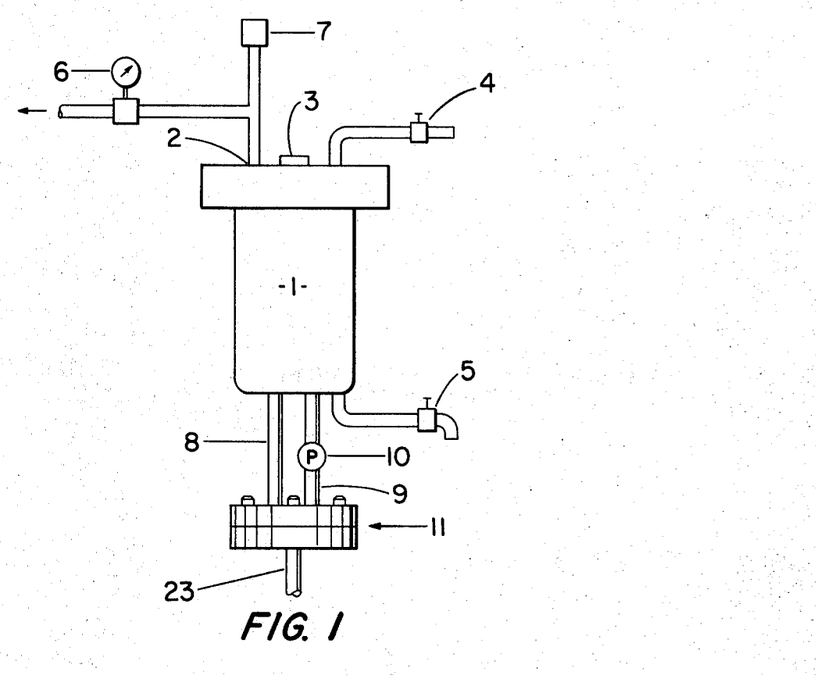
FIG. 1 is a cross-sectional view of the entire desalination apparatus and FIG. 2 is a detail of the membrane housing and assembly.

The apparatus consists of an autoclave or similar pressure vessel 1, fitted with a gas inlet 2, a port 3, a gas vent valve 4, and a drain valve 5. The gas inlet 2 is attached to a cylinder or other gas source and carries a pressure gauge 6 and a blowout or safety valve 7.

Figure 2:
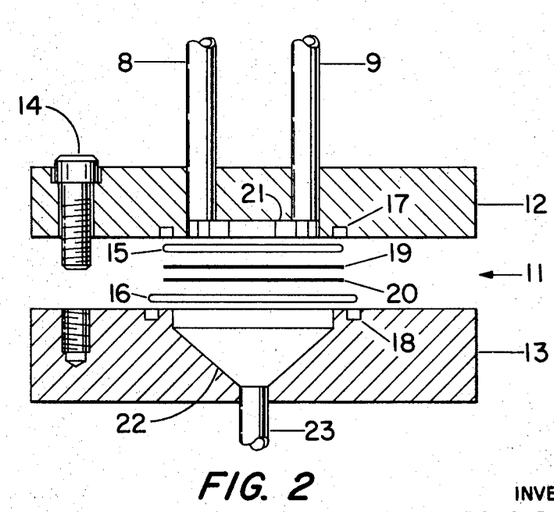

The autoclave 1 is connected by conduits 8 and 9, the latter being fitted with a pump 10 or equivalent circulation means, to membrane housing 11. This housing consists of two solid housing units 12 and 13, fastened together when in use by a plurality of bolts 14 (of which only one is shown); two sealing members 15 and 16, typically rubber O-rings, which fit into circular grooves 17 and 18 in the housing units, groove 17 forming a circle of smaller diameter than groove 18 so that the membrane fits snugly against its support; the desalination membrane 19; and cushioning means 20, typically a piece of filter paper. Upper housing unit 12 has a shallow cylindrical recess 21 with which conduits 8 and 9 communicate. Lower housing unit 14 has a conical depression in which a porous conical disk 22 is mounted; this depression terminates in outlet port 23.

The operation of the apparatus may be generally described as follows: Autoclave 1 is charged with feed water through port 3, and gas (preferably an inert gas such as nitrogen, helium or argon) is introduced via inlet 2 until the pressure within autoclave 1 has reached the desired level. The feed is circulated through conduit 8, recess 21 and conduit 9 by means of pump 10; alternatively other means of circulation may be used, such as convection which may be effected by cooling conduit 8 and heating conduit 9. Under the pressure in autoclave 1, water is desalinated as it is forced through membrane 19; the product passes through cushioning means 20 and porous disk 22 and is collected at outlet port 23.

The velocity at which the water circulates through recess 21 should be adjusted according to the water flux through membrane 19. In the case of a low-flux membrane, such as cellulose acetate, a low circulation rate such as is provided by convection is sufficient. However, when the water flux is high, a boundary layer of solution of very high salt content is formed at the membrane and this may result in low salt rejection unless the flow of water past the membrane remains turbulent so that the boundary layer is diluted.

The effectiveness of the desalination method of this invention is shown by a test in which an aqueous solution of 0.5% sodium chloride content (corresponding to brackish water) was desalinated in an apparatus similar to that shown in the drawing. The membranes used in the respective tests were each 2 inches in diameter and were prepared from the polymeric films of this invention. The tests were run at room temperature and at a pressure of 600–1500 p.s.i.g. Circulation of the solution was effected by a circulating pump. Samples of the product were taken periodically and tested for salt content, and salt rejection was calculated therefrom. The table gives the pressure and time elapsed in the run, the maximum salt rejection for each of the membranes tested, the average salt rejection over the entire test and the approximately water flux.

| Membrane | Pressure, p.s.i.g. | Time | Water flux (approx.), gal./ft.²/day | Salt rejection, percent Maximum | Average |
|---|---|---|---|---|---|
| Example 30 | 600 | 205 min | 6.5 | 50.7 | |
| Example 31 | 600 | 14 min | 12 | 96.8 | 70.3 |
| Example 32 | 600–1,000 | 50 min | 13 | 63.0 | 44.1 |
| Example 33 | 600 | 10 min | 1.5 | 83.5 | |
| Example 34 | 600 | 6 min | 216 | 82.5 | 62 |
| Example 36 | 600–1,000 | 11.8 hrs | 17 | 96.7 | 89 |
| Example 37 | 1,000 | 5.2 hrs | 7 | 82 | 69.2 |
| Example 38 | 600–1,500 | 355 min | 2 | 99 | 96.5 |
| Example 39 | 600 | 28.5 hrs | 15 | 98.4 | 95.6 |
| Example 40 | 600 | 9.3 hrs | 44 | 99.4 | 94.9 |
| Example 41 | 600 | 168 hrs | 73 | 97.5 | 94.7 |
| Example 42 | 600 | 145 min | 110 | 99.2 | 96.3 |

In a similar test, the membrane of Example 35 was evaluated at 600 p.s.i.g., using a 3.5% salt solution. Salt rejection was 80.9% at an average flux of about 3.4 gal./ft.²/day.

Tests were run on the membranes of Examples 43–45 at 600 p.s.i.g., using a 1% salt solution. The following results were obtained.

| | Time | Water flux (approx.), gal./ft.²/day | Salt rejection, percent (average) |
|---|---|---|---|
| Membrane: | | | |
| Example 43 | 48 hrs | 10 | 95.7 |
| Example 44 | 842 hrs | 22 | 98.5 |
| Example 45 | 307 hrs | 26 | 98.5 |

It will be seen from these results that the membranes prepared by crosslinking, with adipyl chloride, copolymers of N-(1,1-dimethyl-3-hydroxybutyl)acrylamide with N - (1,1-dimethyl-3-hydroxybutyl)methacrylamide afford very high salt rejections at high flux.

In addition to the films, latices and coatings described hereinabove, the polymers of N-3-hydroxyalkyl acrylamides may be formed by known techniques into a wide variety of other articles, including structural units, fibers and the like.

What is claimed is:

1. A method for the preparation of a compound of the formula wherein $R^1$ is a lower alkyl or phenyl radical; each of $R^2$, $R^3$, $R^4$ and $R^5$ is individually hydrogen or a lower alkyl or phenyl radical; and $R^6$ is hydrogen or a lower alkyl radical, which comprises hydrolyzing in strongly alkaline solution a 2-vinyl-5,6-dihydro-1,3-oxazine of the formula 2. The method of claim 1 wherein the hydrolysis is effected in a polar organic solvent.

3. The method of claim 1 wherein $R^1$, $R^4$ and $R^5$ are lower alkyl radicals, $R^2$ and $R^3$ are hydrogen, and $R^6$ is hydrogen or methyl.

4. The method of claim 1 wherein the hydrolysis is carried out in a polar organic solvent.

5. The method of claim 4 wherein the organic solvent is a lower alkanol.

6. The method of claim 4 wherein the polar solvent is an ether.

7. A method according to claim 3 wherein the oxazine is 2-vinyl-4,4,6-trimethyl-5,6-dihydro-1,3-oxazine and the product of the hydrolysis is N-(1,1-dimethyl-3-hydroxybutyl)acrylamide.

References Cited

UNITED STATES PATENTS 2,968,657   1/1961   Perry et al. _________ 260—244

ALEX MAZEL, Primary Examiner

J. A. NARCAVAGE, Assistant Examiner

U.S. Cl. X.R.

106—288; 117—124, 143, 148, 161; 210—321; 260—29.1, 29.6, 32.6, 32.8, 65, 67, 72, 72.5, 73, 78.4, 78.5, 80.3, 80.7, 80.72, 80.73, 85.5, 86.1, 89.7, 244, 559, 562

UNITED STATES PATENT OFFICE
CERTIFICATE OF CORRECTION

Patent No. 3,531,525            September 29, 1970

Donald I. Hoke et al.

It is certified that error appears in the above identified patent and that said Letters Patent are hereby corrected as shown below:

Column 18, lines 58 to 63, the formula should appear as shown below:

the claims should be renumbered as follows:

| Application Claims | Printed Patent Claims | Should Be | Dependent From |
|---|---|---|---|
| 1 | 1 | 1 | |
| 3 | 2 | 2 | 1 |
| 5 | 3 | 3 | 1 |
| 7 | 4 | 5 | 4 |
| 8 | 5 | 6 | 5 |
| 9 | 6 | 7 | 5 |
| 11 | 7 | 4 | 3 |

Signed and sealed this 29th day of June 1971.

(SEAL)
Attest:

EDWARD M. FLETCHER, JR.
Attesting Officer

WILLIAM E. SCHUYLER, JR.
Commissioner of Patents